US009622500B2

(12) United States Patent
Carder et al.

(10) Patent No.: US 9,622,500 B2
(45) Date of Patent: Apr. 18, 2017

(54) FOOD PRODUCTS PREPARED WITH SOLUBLE WHOLE GRAIN OAT FLOUR

(71) Applicant: The Quaker Oats Company, Chicago, IL (US)

(72) Inventors: Gary D. Carder, Barrington Hills, IL (US); Yongsoo Chung, Palatine, IL (US); Ronald G. Deutsch, Hampshire, IL (US); Juan Carlos Fernandez Feito, Colonia Del Valle (MX); Justin French, Frisco, TX (US); Ursula Vanesa Lay Ma, Palatine, IL (US); Mayte Lee, Delray Beach, FL (US); Margaret J. Miller, Irvington, NY (US); Holly Ramage, Little Elm, TX (US); Robert E. Chatel, Hoffman Estates, IL (US)

(73) Assignee: The Quaker Oats Company, Chicago, IL (US)

( * ) Notice: Subject to any disclaimer, the term of this patent is extended or adjusted under 35 U.S.C. 154(b) by 0 days.

(21) Appl. No.: 14/209,075

(22) Filed: Mar. 13, 2014

(65) Prior Publication Data
US 2014/0193563 A1 Jul. 10, 2014

Related U.S. Application Data

(63) Continuation-in-part of application No. 14/059,566, filed on Oct. 22, 2013, now Pat. No. 9,149,060, which is a continuation of application No. 12/666,509, filed as application No. PCT/US2009/060016 on Oct. 8, 2009, now Pat. No. 8,591,970, which is a continuation-in-part of application No. 12/264,399, filed on Nov. 4, 2008, now Pat. No. 8,574,644.

(60) Provisional application No. 61/783,046, filed on Mar. 14, 2013.

(51) Int. Cl.
| A23L 1/168 | (2006.01) |
| A23L 1/39 | (2006.01) |
| A23L 2/52 | (2006.01) |
| A21D 13/00 | (2017.01) |
| A23G 9/32 | (2006.01) |
| A23L 2/02 | (2006.01) |
| A23G 9/42 | (2006.01) |
| A21D 6/00 | (2006.01) |
| A21D 8/04 | (2006.01) |
| A21D 10/00 | (2006.01) |
| A21D 13/04 | (2017.01) |
| A23G 9/04 | (2006.01) |
| A23P 10/10 | (2016.01) |
| A23P 30/20 | (2016.01) |
| A23L 7/10 | (2016.01) |
| A23L 7/143 | (2016.01) |
| A23L 19/00 | (2016.01) |
| A23L 33/20 | (2016.01) |
| A23L 33/21 | (2016.01) |
| A23L 23/00 | (2016.01) |

(52) U.S. Cl.
CPC ............. *A23L 1/168* (2013.01); *A21D 6/00* (2013.01); *A21D 6/003* (2013.01); *A21D 8/042* (2013.01); *A21D 10/002* (2013.01); *A21D 13/00* (2013.01); *A21D 13/04* (2013.01); *A23G 9/045* (2013.01); *A23G 9/32* (2013.01); *A23G 9/42* (2013.01); *A23L 2/02* (2013.01); *A23L 2/52* (2013.01); *A23L 7/143* (2016.08); *A23L 7/198* (2016.08); *A23L 19/09* (2016.08); *A23L 23/00* (2016.08); *A23L 33/20* (2016.08); *A23L 33/21* (2016.08); *A23P 10/10* (2016.08); *A23P 30/20* (2016.08); *A23V 2002/00* (2013.01)

(58) Field of Classification Search
CPC ... A23L 1/168; A23L 1/39; A23L 2/05; A21D 13/00
USPC .......................... 426/549, 619, 589, 565, 590
See application file for complete search history.

(56) References Cited

U.S. PATENT DOCUMENTS

| 1,163,175 | A | 12/1915 | Rullman |
| 1,384,894 | A | 7/1921 | Horlick |
| 3,116,150 | A | 12/1963 | Baker |
| 3,317,402 | A | 5/1967 | Smith et al. |
| 3,391,003 | A | 7/1968 | Armstrong |
| 3,494,769 | A | 2/1970 | Tressler |
| 3,579,352 | A | 5/1971 | Bookwalter |
| 3,595,671 | A | 7/1971 | Cooke |
| 3,732,109 | A | 5/1973 | Poat |

(Continued)

FOREIGN PATENT DOCUMENTS

| AU | 1989045913 | 12/1989 |
| CA | 1045890 | 1/1979 |

(Continued)

OTHER PUBLICATIONS

International Search Report and Written Opinion for PCT/US2014/26367 dated Sep. 9, 2014.

(Continued)

*Primary Examiner* — Hamid R Badr
(74) *Attorney, Agent, or Firm* — Brandon V. Zuniga; James R. Gourley; Carstens & Cahoon, LLP

(57) ABSTRACT

Food products prepared from whole grain oat flour having soluble components. The soluble whole oat flour maintains its standard of identity as whole grain and thus has the characteristics of whole grain oats. Aspects of the present invention relate to the use of the soluble oat flour in liquid food products such as beverages, semi-solid food products such as yogurt, and solid food products such as bakery items in order to provide enhanced health benefits.

4 Claims, 8 Drawing Sheets

(56) References Cited

U.S. PATENT DOCUMENTS

| | | |
|---|---|---|
| 3,851,085 A | 11/1974 | Rodgers et al. |
| 3,869,558 A | 3/1975 | Hampton et al. |
| 3,925,343 A | 12/1975 | Hampton et al. |
| 3,958,016 A | 5/1976 | Galle et al. |
| 4,028,468 A | 6/1977 | Hohner |
| 4,038,427 A | 7/1977 | Martin |
| 4,171,384 A | 10/1979 | Chwalek et al. |
| 4,266,027 A | 5/1981 | Muller et al. |
| 4,282,319 A | 8/1981 | Conrad |
| 4,330,625 A | 5/1982 | Miller et al. |
| 4,377,602 A | 3/1983 | Conrad |
| 4,431,674 A | 2/1984 | Fulger et al. |
| 4,435,429 A | 3/1984 | Burrows et al. |
| 4,435,430 A | 3/1984 | Fulger et al. |
| 4,438,150 A | 3/1984 | Gantwerker |
| 4,439,460 A | 3/1984 | Tsau et al. |
| 4,500,558 A | 2/1985 | Fulger |
| 4,551,347 A | 11/1985 | Karwowski |
| 4,613,507 A | 9/1986 | Fulger et al. |
| 4,656,040 A | 4/1987 | Fulger et al. |
| 4,668,519 A * | 5/1987 | Dartey ............... A21D 2/16 426/548 |
| 4,692,340 A | 9/1987 | Grutte |
| 4,710,386 A | 12/1987 | Fulger et al. |
| 4,777,056 A | 10/1988 | Buhler et al. |
| 4,834,988 A | 5/1989 | Karwowski et al. |
| 4,834,989 A | 5/1989 | Bolles et al. |
| 4,886,665 A | 12/1989 | Kovacs |
| 4,996,063 A | 2/1991 | Inglett |
| 4,999,208 A | 3/1991 | Lengerich et al. |
| 5,021,248 A | 6/1991 | Stark et al. |
| 5,082,673 A | 1/1992 | Inglett |
| 5,106,343 A | 4/1992 | Laufer |
| 5,106,634 A | 4/1992 | Thacker |
| 5,145,698 A | 9/1992 | Cajigas |
| 5,225,219 A | 7/1993 | Inglett |
| 5,234,704 A | 8/1993 | Devine |
| 5,320,856 A | 6/1994 | Veronesi |
| 5,334,407 A | 8/1994 | Donnelly |
| 5,385,746 A | 1/1995 | De Almeida |
| 5,395,623 A | 3/1995 | Kovach |
| 5,407,694 A | 4/1995 | Devine |
| 5,458,893 A | 10/1995 | Smith |
| 5,476,675 A | 12/1995 | Lou |
| 5,490,997 A | 2/1996 | Devine |
| 5,523,109 A | 6/1996 | Hellweg |
| 5,554,402 A * | 9/1996 | Smith ............... A21D 13/04 426/391 |
| 5,571,334 A | 11/1996 | Dunn et al. |
| 5,656,317 A | 8/1997 | Smits et al. |
| 5,686,123 A | 11/1997 | Lindahl |
| 5,744,187 A | 4/1998 | Gaynor |
| 5,846,786 A | 12/1998 | Senkeleski et al. |
| 5,849,090 A | 12/1998 | Haralampu et al. |
| 5,863,590 A | 1/1999 | Alan |
| 5,888,548 A | 3/1999 | Wongsuragrai et al. |
| 5,912,031 A | 6/1999 | Fitchett |
| 5,932,264 A | 8/1999 | Hurd |
| 5,981,237 A | 11/1999 | Meagher |
| 5,985,339 A | 11/1999 | Kamarei |
| 5,997,917 A | 12/1999 | Uchida et al. |
| 6,013,289 A | 1/2000 | Blank et al. |
| 6,054,302 A | 4/2000 | Shi et al. |
| 6,135,015 A | 10/2000 | Mendez |
| 6,168,821 B1 | 1/2001 | Castleberry |
| 6,190,708 B1 | 2/2001 | Triantafyllou |
| 6,210,722 B1 | 4/2001 | Wullschleger et al. |
| 6,210,738 B1 | 4/2001 | Chen |
| 6,210,741 B1 | 4/2001 | Van Lengerich |
| 6,244,528 B1 | 6/2001 | Wallis et al. |
| 6,287,621 B1 | 9/2001 | Lacourse et al. |
| 6,287,626 B1 | 9/2001 | Fox |
| 6,451,369 B1 | 9/2002 | Triantafyllou |
| 6,482,459 B1 | 11/2002 | Anderson |
| 6,551,366 B1 | 4/2003 | D'Souza et al. |
| 6,592,914 B1 | 7/2003 | Triantafyllou |
| 6,610,349 B1 | 8/2003 | Delrue et al. |
| 6,617,446 B1 | 9/2003 | Papadopoulos |
| 6,685,974 B2 | 2/2004 | Whalen |
| 6,720,022 B1 | 4/2004 | Arnaut et al. |
| 6,723,358 B1 | 4/2004 | van Lengerich |
| 6,759,077 B1 | 7/2004 | Lewis et al. |
| 6,797,307 B2 | 9/2004 | Malkki et al. |
| 7,030,092 B1 | 4/2006 | Levine |
| 7,160,564 B2 | 1/2007 | Oste |
| 7,244,457 B2 | 7/2007 | Racicot |
| 7,419,694 B2 | 9/2008 | Korolchuk |
| 7,425,344 B2 | 9/2008 | Korolchuk et al. |
| 7,754,270 B2 | 7/2010 | Wuersch et al. |
| 7,794,774 B2 | 9/2010 | Foster |
| 8,241,696 B2 | 8/2012 | Chung |
| 8,518,469 B2 | 8/2013 | MacDonald |
| 9,149,060 B2 | 10/2015 | Chatel |
| 2001/0002269 A1 | 5/2001 | Zhao |
| 2001/0022986 A1 | 9/2001 | Girsh |
| 2002/0127319 A1 | 9/2002 | Gare |
| 2002/0187224 A1 | 12/2002 | Haefliger et al. |
| 2003/0170362 A1 | 9/2003 | Manning et al. |
| 2004/0028797 A1 | 2/2004 | Squire et al. |
| 2004/0140584 A1 | 7/2004 | Wang et al. |
| 2004/0151805 A1 | 8/2004 | Gao et al. |
| 2004/0156971 A1 | 8/2004 | Wuersch et al. |
| 2004/0258829 A1 | 12/2004 | Zheng et al. |
| 2005/0064080 A1 | 3/2005 | Creighton et al. |
| 2005/0089602 A1 | 4/2005 | Kvist et al. |
| 2005/0106216 A1 | 5/2005 | Maurer et al. |
| 2005/0181114 A1 | 8/2005 | Bruemmer |
| 2005/0191400 A1 | 9/2005 | Satyavolu et al. |
| 2005/0214347 A1 | 9/2005 | Astrup et al. |
| 2005/0238777 A1 | 10/2005 | Klingeberg et al. |
| 2005/0244563 A1 | 11/2005 | Cavalieri et al. |
| 2005/0260305 A1 | 11/2005 | Adele et al. |
| 2006/0008574 A1 | 1/2006 | Begli et al. |
| 2006/0013940 A1 | 1/2006 | Mueller et al. |
| 2006/0093720 A1 | 5/2006 | Tatz |
| 2006/0115573 A1 | 6/2006 | Singer et al. |
| 2006/0121174 A1 | 6/2006 | Franke |
| 2006/0134299 A1 | 6/2006 | Lahteenmaki |
| 2006/0141097 A1 | 6/2006 | Guo |
| 2006/0240148 A1 | 10/2006 | Nguyen et al. |
| 2006/0251791 A1 | 11/2006 | Rubio et al. |
| 2006/0257548 A1 | 11/2006 | Crofskey |
| 2006/0280838 A1 | 12/2006 | Kvist et al. |
| 2006/0286269 A1 | 12/2006 | Shah et al. |
| 2007/0014892 A1 | 1/2007 | Mitchell et al. |
| 2007/0059340 A1 | 3/2007 | Bello et al. |
| 2007/0104854 A1 | 5/2007 | Foster et al. |
| 2007/0141218 A1 | 6/2007 | Chatel |
| 2007/0154609 A1 | 7/2007 | Li |
| 2007/0172568 A1 | 7/2007 | Spelman |
| 2007/0178199 A1 | 8/2007 | Minor et al. |
| 2007/0184175 A1 | 8/2007 | Rubio et al. |
| 2007/0212472 A1 | 9/2007 | Holenstein et al. |
| 2007/0243301 A1 | 10/2007 | Barnett et al. |
| 2007/0264400 A1 | 11/2007 | Milne |
| 2007/0292583 A1 | 12/2007 | Haynes et al. |
| 2008/0003340 A1 | 1/2008 | Karwowski et al. |
| 2008/0008801 A1 | 1/2008 | Barnekow et al. |
| 2008/0131582 A1 | 6/2008 | Karwowski et al. |
| 2008/0171114 A1 | 7/2008 | Castillo Rodriguez et al. |
| 2008/0260909 A1 | 10/2008 | Chung et al. |
| 2008/0305212 A1 | 12/2008 | Wong |
| 2009/0053771 A1 | 2/2009 | Dale et al. |
| 2009/0148562 A1 | 6/2009 | Lin et al. |
| 2009/0181128 A1 | 7/2009 | Blumenthal et al. |
| 2009/0238935 A1 | 9/2009 | Haynes et al. |
| 2009/0311376 A1 | 12/2009 | Rao et al. |
| 2010/0104718 A1 | 4/2010 | Durand |
| 2010/0112167 A1 | 5/2010 | Chatel |
| 2010/0316765 A1 | 12/2010 | French et al. |
| 2011/0020523 A1 | 1/2011 | Pereyra et al. |
| 2012/0082740 A1 | 4/2012 | Collins et al. |
| 2012/0245111 A1 | 9/2012 | Hoebler |
| 2013/0017300 A1 | 1/2013 | Avila et al. |

(56) References Cited

U.S. PATENT DOCUMENTS

| | | |
|---|---|---|
| 2013/0170362 A1 | 7/2013 | Futaki et al. |
| 2013/0183405 A1 | 7/2013 | Chatel et al. |
| 2013/0209610 A1 | 8/2013 | Carder et al. |
| 2014/0193563 A1 | 7/2014 | Carder |
| 2014/0193564 A1 | 7/2014 | Carder |
| 2015/0351432 A1 | 12/2015 | Triantafyllou |
| 2016/0106125 A1 | 4/2016 | Rascon |

FOREIGN PATENT DOCUMENTS

| | | |
|---|---|---|
| CN | 1386446 | 12/2002 |
| CN | 1499940 | 5/2004 |
| DE | 970141 | 8/1958 |
| EP | 3231729 | 8/1987 |
| EP | 0609169 | 8/1994 |
| EP | 0634106 A1 | 1/1995 |
| EP | 0806434 A1 | 11/1997 |
| EP | 0897673 A2 | 2/1999 |
| EP | 1782699 A2 | 5/2007 |
| EP | 2205101 | 7/2010 |
| FR | 2620906 | 3/1989 |
| GB | 1168692 A | 10/1969 |
| JP | S63116657 | 5/1988 |
| RU | 2237419 | 10/2001 |
| WO | 9210106 A1 | 6/1992 |
| WO | 9604799 | 2/1996 |
| WO | 02076244 | 10/2002 |
| WO | 03011052 | 2/2003 |
| WO | 2004086878 A2 | 10/2004 |
| WO | 2007020059 | 2/2007 |
| WO | 2008028994 | 3/2008 |
| WO | 2008096044 | 8/2008 |
| WO | 2009077659 | 6/2009 |
| WO | 2009127687 A1 | 10/2009 |

OTHER PUBLICATIONS

International Search Report and Written Opinion for PCT/US2014/17288 mailed Jun. 13, 2014.
Chinese Patent Application 200880025660.8, Office Action dated Aug. 2, 2012.
Wang Changquing, et al, Study on the Extruding Production Method of Soluble Oats Fiber, vol. 28, No. 2, pp. 45-48, dated Mar. 20, 2002, with English Abstract.
Vasanthan, V. et al., "Dextrinization of Starch in Barley Flours With Thermostable Alpha-Amylase by Extrusion Cooking", Starke-Starch, Wiley-VCH Verlag, Weinheim, DE, XP001110714, ISSN: 0038-9056, vol. 53, No. 12, pp. 616-622, dated Dec. 1, 2001 (Abstract Only).
Gutkoski, L.C., et al., "Effect of Extrusion Process Variables on Physical and Chemical Properties of Extruded Oat Products", Plant Foods for Human Nutrition, © 2000 Kluwer Academic Publishers, pp. 315-325.
Inglett, G.E. et al. 1994. Oat beta-glucan-amylodextrin: Preliminary preparations and biological properties. plant Fd. for Human Nutrition. 45: 53-61.
Linko Y Y et al: The effect of HTST-extrusion on retention of cereal alpha-amylase activity and on enzymatic hydrolisis of barley starch, Food Processing Systems, Applied Science Publ, UK, Jan. 1, 1980 (Jan. 1, 1980), pp. Abstr, 4.2.25, 210-223, XP009127925, ISBN: 978-0-85334-896-2.
Peter Koelln KGAA: "Kochjule, Hafer-Getrank mit Fruchtsaft", XP002499645, Internet Citation, URL:http://www.koelln.de/downloads/37/Kochjule.pdf>, retrieved from the Internet on Oct. 14, 2008, pp. 1-19, dated Oct. 14, 2008.
Peter Kolln KGAA: "KollnFlocken Instant", XP002499437, Internet Citation, URL:http://www.koelln.de/produkte/1/15/index.html>, retrieved from the Internet on Oct. 13, 2008, p. 1, dated Oct. 13, 2008.

Written Opinion and International Search Report for PCT Application No. PCT/US2010/038506 dated Aug. 10, 2010, 18 pages.
Zhang Haodong, "Starch Article Technology", Jilin Science and Technology Press, dated Feb. 29, 2008.
Australian Patent Application No. 2010260219 Office Action dated Aug. 23, 2012.
Chinese Patent Application No. 201080022395.5 Office Action dated Nov. 8, 2012.
Canadian Patent Application No. 2,761,566 Office Action dated Dec. 27, 2012.
Russian Patent Application No. 2011145771 Office Action dated Jan. 21, 2013.
European Patent Application 09740225.9 Office Action dated May 16, 2011.
European Patent Application 09 740 225.9 Office Action dated Oct. 11, 2010.
Chinese Patent Application No. 200880025660.8, Office Action dated Apr. 11, 2013.
Russian Application No. 2011145771 Office Action dated Apr. 14, 2013.
Chinese Patent Application No. 200880025660.8, Office Action dated Oct. 10, 2013.
European Application No. 12188138.7 Office Action dated Nov. 13, 2013.
Mexican Application No. Mexican/a/2010/000255 OA dated Aug. 29, 2013.
Malaysian Application No. PI20095590 OA dated Apr. 15, 2014.
Australian Application No. 2009251225 OA dated Mar. 28, 2014.
Anonymous: "Ovsena nahradka mlieka", XP002561727, URL:http://web.archive.org/web/20080420075151/http://www.aspsk.sk/ovsene_mlieko.htm>, retrieved from the Internet on Dec. 18, 2009, pp. 1-1, dated Apr. 20, 2008.
Gualberto, D.G. et al., Effect of extrusion processing on the soluble and insoluble fiber, and phytic acid contents of cereal brans, dated Sep. 28, 1997.
PCT/US2009/060016, International Search Report, dated Feb. 8, 2010.
Peter Kolln KGAA: "Kolln Schmelzflocken Dinkel-Hafer", XP002499438, Internet Citation, URL:http://www.koelln.de/produkte/2/103/index.html>, retrieved from the Internet on Oct. 13, 2008, p. 1, dated Oct. 13, 2008.
Wang, Ming-chun, et al, Extrusion Technology Applied in the Nutritional Health Foods, College of Food Engineering & Biologic Technology, Tianjin University of Science and Technology, Tianjin 300457, pp. 63-66, dated Aug. 1, 2007, with English Abstract.
Anonymous: "Goldkill Instant Barley Drink", XP002561728, URL:http://web.archive.org/web/20060303003347/goldkill. com/goldkili_instant.php>, retrieved from the Internet on Dec. 28, 2009, pp. 1-2, dated Mar. 3, 2006.
Grenus, Food Product Design, Applications, Agglomerations, Jul. 10, 2014, Weeks Publishing Co., pp. 1-4, www.foodproductdesign.com/articles/2004/07/food-product-design-applications.
PCT Application No. PCT/US2008/060323 International Search Report and Written Opinion, dated Aug. 13, 2008.
PCT Application No. PCT/US2009/059916 International Search Report and Written Opinion, dated Feb. 16, 2010.
PCT Application No. PCT/US2014/021913 International Search Report and Written Opinion, dated Jun. 23, 2014.
Anderson, et al. "Gelatinazation of corn grits by roll cooking, extrusion cooking and steaming," Staerke 22:130-135.
Davis, "The Effect of Cold on Micro-Organisms in Relation to Dairying," Express Dairy Co (London), Proceedigns of the Society for Applied Bacteriology, vol. 14, Issue 2, pp. 216-242, Oct. 1951.
Food Reference, About.com "Why Does Milk Curdle," http://foodreference.about.com/od/Dairy/a/Why-Does-Milk.Curdle.htm, pp. 1-2.
PCT Application No. PCT/US2012/046450 International Search Report and Written Opinion mailed Sep. 6, 2012.
Hoseney, R. Carl, "Principles of Cereal Science and Technology," 1986, American Association of Cereal Chemists, Inc., St. Paul Minnesota 55121, pp. 148-149 (4 pages).

* cited by examiner

FOOD PRODUCTS PREPARED WITH SOLUBLE WHOLE GRAIN OAT FLOUR

CROSS-REFERENCE TO RELATED APPLICATIONS

This application claims priority to U.S. Provisional Patent Application No. 61/783,046 filed on Mar. 14, 2013 and is a continuation-in-part of application Ser. No. 14/059,566 filed on Oct. 22, 2013, which is a continuation of application Ser. No. 12/666,509, filed on Apr. 25, 2011, now U.S. Pat. No. 8,591,970, filed as Application No. PCT/US2009/060016 on Oct. 8, 2009, which is a continuation-in-part of application Ser. No. 12/264,399, filed on Nov. 4, 2008, now U.S. Pat. No. 8,574,644, the disclosures of which are expressly incorporated herein by reference. This application is being filed concurrently with non-provisional application Ser. No. 14/209,000.

FIELD OF THE INVENTION

The present invention relates generally to food products prepared with whole oat flour having soluble components (hereinafter "soluble oat flour").

BACKGROUND OF THE INVENTION

Oatmeal has for many years been a staple of the human diet due to its health benefits. For example, numerous studies have shown that eating oatmeal on a daily basis can help lower blood cholesterol, reduce risk of heart disease, promote healthy blood flows as well as maintain healthy blood pressure levels. Additionally, oatmeal has a high content of complex carbohydrates and fibers, which facilitates slow digestion and stable blood-glucose levels.

With today's hectic lifestyle, consumers are demanding convenience, such as portability and ease of preparation. Consumers desire oatmeal from a variety of food sources including beverages and convenience foods such as bars, cookies, crackers, smoothies, shakes (e.g. breakfast shakes), and the like.

It is desired to prepare a whole oat product that has sufficient soluble fiber to meet the FDA threshold necessary to justify a health claim. For example, a whole oat product must have 0.75 g soluble beta-glucan fiber per serving of food to support a health claim. To prepare an oat beverage that contains at least 0.75 g soluble oat fiber per serving (about 18 g of whole grain oats), highly soluble oat flour must be used. "Studies show that eating whole grains instead of refined grains lowers the risk of many chronic diseases. While benefits are most pronounced for those consuming at least 3 servings daily, some studies show reduced risks from as little as one serving daily." http://wholegrainscouncil.org/whoie-grains-101/what-are-the-health-benefits Note that 1 full serving of whole grain is 16 g.

A need exists in the field for different types of food products that are made with healthier components such as with whole oat flour that is highly dispersible in liquid, semisolid, or solid media, and maintains its standard of identity as whole grain.

BRIEF SUMMARY OF THE INVENTION

Aspects of the invention relate to food products containing highly dispersible, soluble whole oat flour. The soluble whole oat flour maintains its standard of identity as whole grain and thus has the characteristics of whole grain oats.

Aspects of the present invention relate to the use of the soluble oat flour in various food products including liquid food products such as beverages, semi-solid food products such as yogurt, and solid food products such as bakery items in order to provide enhanced health benefits.

These and other aspects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

DETAILED DESCRIPTION OF THE INVENTION

The present invention relates to products containing soluble whole oat flour. The soluble oat flour is prepared using an extruder or other suitable continuous cooker. The process is easier, less expensive, and less time-consuming than prior art processes. In particular the process of preparing soluble oat flour is found in U.S. patent application Ser. No. 12/264,399 filed Nov. 4, 2008 and issued as U.S. Pat. No. 8,574,644 on Nov. 5, 2013, the contents of which is expressly incorporated herein by reference in its entirety.

Figure 1:
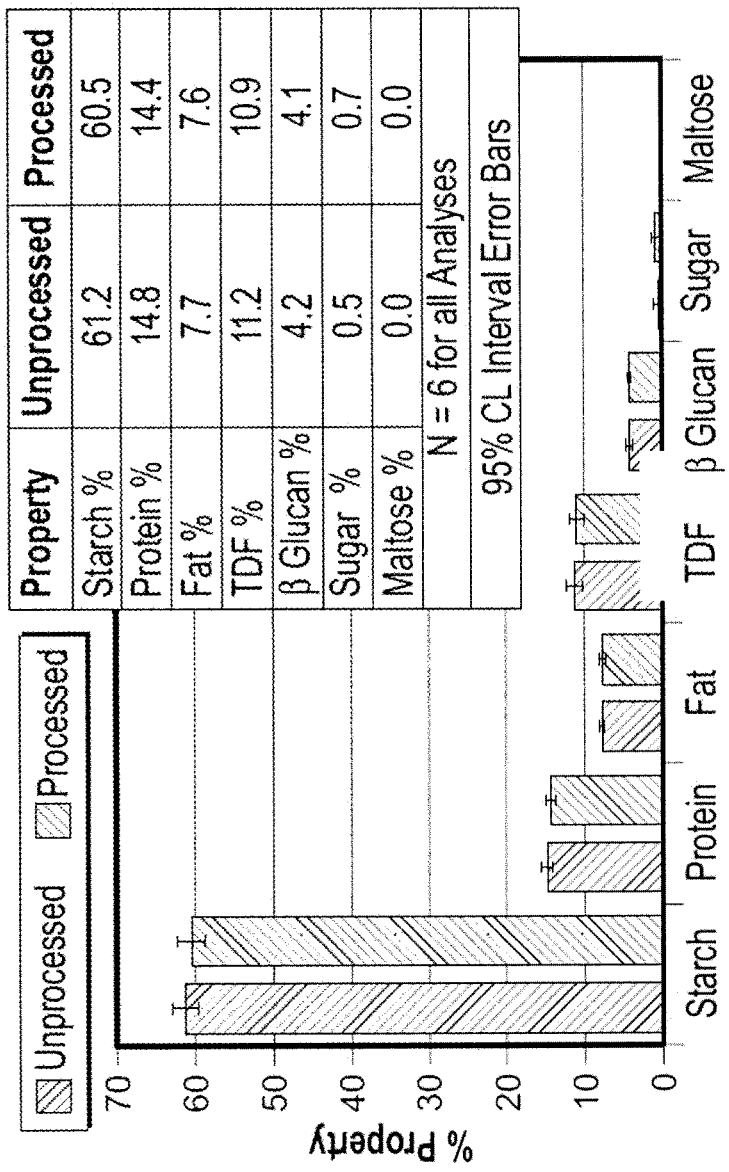
FIG. 1 depicts a proximate composition of unprocessed and processed whole oat flour.

The soluble whole oat flour (whole grain) made in accordance with the methods described herein maintains its standard of identity as whole grain throughout processing. "Whole grain" or "standard of identity as whole grain" shall mean that the cereal grain, in this instance, oat, "consists of the intact, ground cracked or flaked caryopsis, whole principal anatomical components—the starchy endosperm, germ and bran—are present in the same relative proportions as they exist in the intact caryopsis—should be considered a whole grain food." As shown in FIG. 1, the processed oat flour made in accordance with the instant disclosure maintains the same levels of starch, protein, fat, total dietary fiber (TDF), β glucan, sugar and maltose as the unprocessed oat flour.

The term "soluble oat flour" or "soluble whole grain oat flour" refers to flour that maintains soluble components such as beta-glucan but also is highly dispersible in liquids such as water. The dispersibility of the flour was measured in water observing formation of a lump and size of the lumps on the top and bottom of the water after stirring for five (5) seconds. "Highly dispersible" therefore means that there are no lumps present or formed after stirring the mixture for about 5 seconds. As the skilled artisan would recognize, stirring may also be substituted with shaking or some other specific movement to incorporate and mix the flour into the liquid.

The term "oat flour", "regular oat flour", "whole oat flour", "typical oat flour", and "unprocessed oat flour" refers to whole oat flour that is made by conventional or traditional milling methods and not "soluble oat flour" or oat flour made in accordance with the methods described herein.

With respect to the products the soluble oat flour made in accordance with the methods disclosed herein, the term "hot beverage" or "hot comestible" shall mean a beverage or comestible that is typically served or consumed between about 55° C. and 85° C. Similarly "cold beverage" or "cold comestible" as used herein shall refer to a beverage or comestible that is typically serve or consume between about 4° C. and 25° C. The skilled food technician would recognize, however, that although the beverages and comestibles are intended to be consumed at the temperature ranges discussed above, the respective beverages and comestibles may be served and consumed at temperatures outside of these ranges based on consumer preference or circumstance.

Initially, enzyme-treated oat flour is prepared by combining a whole oat flour starting mixture and a suitable enzyme solution in a mixer (sometimes called a pre-conditioner) and then heating the mixture. The enzyme-treated mixture is then subjected to an extrusion process to gelatinize, hydrolyze, and cook the oat flour mixture.

A suitable starting mixture is prepared by combining the whole oat flour with other desired ingredients. For example, a typical starting mixture contains whole oat flour and granulated sugar. Maltodextrin and/or at least one antioxidant may also be added.

The whole oat flour is present in an amount of about 50% to about 100% by weight of the total weight of the starting composition. In further aspects, the whole oat flour is present in amounts of about 80% to about 95% by weight or about 90% to about 95% by weight.

The sugar can be any suitable sugar known to those skilled in the art. Non-limiting examples of sugars include sucrose, fructose, dextrose, other sugars known in the art, and combinations thereof. Typically, the sugar is present in an amount of about 1% to about 15% by weight or about 3% to about 15% by weight of the total weight of the starting composition. In further aspects, the sugar is present in amounts of about 3% to about 7% by weight.

The maltodextrin may be present in an amount of about 0% to about 15% by weight of the total weight of the starting composition. In further aspects, the maltodextrin is present in amounts of about 3% to about 7% by weight.

The antioxidant may be any suitable antioxidant such as mixed natural tocopherols or artificial antioxidant such as BHT and BHA. The antioxidant is present in an amount from 0.1% to 2% by weight. In further aspects, the antioxidant is present in amounts of about 0.25% to about 0.75% by weight.

A suitable, but non-limiting, flour mix formula for extrusion process.

| Ingredient | % |
| --- | --- |
| Whole oat flour | 89.35 |
| Sugar | 5.00 |
| Maltodextrin | 5.00 |
| Mixed tocopherols | 0.50 |
| α-amylase | 0.15 |
| Total | 100.00 |

The enzyme may be any suitable enzyme to hydrolyze the starch in the oat flour and does not change or adversely affect the beta-glucan that is present in the oat flour. Suitable enzymes include α-amylase in the range of about 0.01-0.5%, for example about 0.1-0.2%. In one aspect of the present disclosure, the α-amylase used may be Validase 1000 L having approximately 1,000,000 MWU/g (MWU—Modified Wohlgemuth Unit). Whether the beta-glucan has changed by the hydrolysis can be determined by any suitable method such as by analyzing the structure of the beta-glucan. This can be done by laser light scattering mass spectroscopy. The enzyme is added to water to form an enzyme water solution. Then the enzyme-water solution is combined with the starting mixture in the pre-conditioner.

The starting mixture and enzyme solution is heated to between about 120° F. and about 200° F., in particular to between about 140° F. and about 180° F., e.g. 165° F. for about 3 to 5 minutes to initiate gelatinization of starch. The enzyme then reacts on gelatinized starches to break down some of the high molecular weight amylopectin starch fractions (having an average molecular weight of $5.8\text{-}6.2\times 10^6$ Dalton) into low molecular weight amylopectin starch fractions (having an average molecular weight of $1.7\text{-}2.0\times 10^6$ Dalton).

The starting mixture and enzyme solution may be mixed in any suitable vessel such as a high speed mixer that permits liquid to be added to free-flowing flour. The output is a free-flowing wetted flour mixture having a moisture content of about 25 to about 40%. The residence time is the time sufficient to obtain the desired result and typically 1 to 5 min.

The enzyme-treated mixture is subsequently added to an extruder (continuous cooker) to gelatinize, hydrolyze, and cook the starch. The mixture resides in the extruder for a time sufficient to gelatinize and cook the starch, but not long enough to dextrinize or otherwise modify the starch to void the whole grain aspect, generally at least 1 minute, typically, about 1 to about 1.5 minutes, to form a dough. Generally, the material is heated from an initial inlet temperature to a final exit temperature in order to provide the energy for starch gelatinization.

Starch gelatinization requires water and heat. The gelatinization temperature range for oats is 127° F. to 160° F. (53-71° C.). If the moisture is less than about 60% then higher temperatures are required.

Heat may be applied through the extruder barrel wall such as with a jacket around the barrel through which a hot medium like steam, water or oil is circulated, or electric heaters imbedded in the barrel. Typically the extrusion occurs at barrel temperatures between 140° F. and 350° F., for example between 175° F. and 340° F., more specifically about 180° F.-300° F.

Heat is also generated within the material by friction as it moves within the extruder by the dissipation of mechanical energy in the extruder, which is equal to the product of the viscosity and the shear rate squared for a Newtonian fluid. Shear is controlled by the design of the extruder screw(s) and the screw speed. Viscosity is a function of starch structure, temperature, moisture content, fat content and shear. The temperature of the dough increases in the extruder to approximately 212° F. and 300° F.

Low shear is applied to the mixture in the extruder. As the enzyme has preconditioned the starch, high shear is not required for this process. High shear makes it difficult to control the degree of hydrolysis. It can also increase the dough temperature excessively, which can overcook it resulting in too much cooked grain flavor. It is noted that the barrel temperature and the dough temperature may be different.

The process balances limiting the dough temperature to avoid too much cooked grain flavor and to keep the enzyme active. The process is balanced such that the dough temperature rises to a sufficient temperature to deactivate the enzyme. Such temperatures are at least 280° F., generally 212° F. to 300° F. A low shear extrusion process is characterized relative to high shear extrusion by high moisture and a low shear screw design versus low moisture and a high shear screw design.

Any suitable extruder may be used including suitable single screw or twin screw extruders. Typical, but not limiting, screw speeds are 200-350 rpm.

The resulting product may be pelletized using a forming extruder and dried, typically to about 1.5 to about 10%, for example 6.5 to 8.5%, moisture content. The pellets may be granulated to a max 5% through a US 40 screen. The particle size of the resulting granulated product is about 10-500 microns, for instance, about 1-450 microns, more particularly about 30-420 microns.

Jet milling may be used to mill the pellets produced in accordance with aspects of the present disclosure. Jet milling creates ultrafine particles. In particular, jet milling reduces the particle size of the pelletized soluble oat flour to less than about 90 micron, for example, less than about 50 microns, such as about 46 microns. As one of ordinary skill in the art would recognize, alternative milling processes can be used to reduce the particle size or micronize the flour to, 0.5-50 microns, such as between 10 to 50 microns.

The resulting soluble oat flour includes beta glucan soluble fiber, such as beta-1, 3-glucan, beta-1, 6-glucan, or beta-1, 4-glucan or mixtures thereof. In addition to beta glucan naturally present in the oats, beta glucan may also be added as approved by the FDA. In certain embodiments, the oat flour preferably contains at least about 3% to 5% or about 3.7% to 4% beta glucan. In certain embodiments, the oat flour containing liquid, semi-solid, or solid product contains 0.1% to about 1.5% beta glucan, or about 0.8% to 1.3% beta glucan. Other amounts of beta glucan are also useful.

The soluble oat flour disperses in less than about 5 seconds in a liquid media at 25° C.

The soluble oat flour prepared in accordance with the process described above may be utilized in a variety of products such as: ready-to-drink (RTD) beverages such as dairy-based beverages and juice-based beverages; powders such as for cold and hot instant beverages, instant pudding, custards, mousses, or gelatin, or as an additive to smoothies or shakes for example; dairy products such as yogurt, ice cream, oat-milk, and processed cheeses such as cream cheese; bakery products such as cookies, muffins, breads, pizza crust, bagels, cakes, crepes, and pancakes; ready-to-eat (RTE) snacks such as pudding, fruit leather, and fruit gel snacks; starters or side dishes such as soups (including, without limitation instant soups and ready-to-eat soups) and congee; seasoning mixes, dressings, and sauces; grain-based foods such as upma and hummus; meat-based foods such as meat balls; polenta; and fillings for food products such as mousse, cream, and fudge. The soluble oat flour may also be used as texture modifiers for bakery products or as a replacement for gums, such as guar gum, for instant oatmeal products. Moreover, the soluble oat flour may be used as a fat replacer in products such as cream-based dips. This list is not all-inclusive and one skilled in the art would recognize that the soluble oat flour may be added to other beverages and food products in accordance with the invention.

It was discovered that the use of the soluble oat flour prepared in accordance with the method described above provides unexpected processing improvements and properties over unprocessed oat flour or soluble oat flour prepared by other methods.

For example, oat flour used in RTE or RTD products is typically pasteurized or sterilized in order to kill microorganisms that could cause disease or spoilage. This high heat process ensures that the flour is safe and healthy to consume. Such pasteurization and sterilization cannot be easily done on dry flour. Hence, prior to pasteurization or sterilization, the oat flour needs to be completely hydrated to ensure appropriate heat transfer through the oat flour during the kill step. Full hydration and complete gelatinization of the oat flour are desired to ensure the viscosity of the product will not dramatically increase during further processing.

Oat flour is typically hydrated by dispersing the oat flour in water and heating the slurry using an appropriate time and temperature combination that results in starch gelatinization. Typically the temperature is 90° C. and the time to hydrate fully is at least 25 minutes. Lower hydration temperatures will require longer times. Then the slurry needs to be cooled down to blend the other ingredients. Then the oat flour slurry may be pasteurized or sterilized by any suitable means such as High Temperature Short time (HTST) pasteurization or Ultra High Temperature (UHT) sterilization. Pasteurization or sterilization is a necessary step for RTD or RTE liquid or semi-solid foods.

It was discovered that soluble oat flour made in accordance with the process described above hydrates without the need of a lengthy heating process of standard or typical oat flour. The quality of the oats is maintained, that is the integrity of the oat flour is maintained throughout the process. With soluble oat flour, the temperature may be around chilled to room temperature, typically 4 to 30° C. reducing the total processing time by 1.5 hours. Typically the amount of soluble oat flour in the water is 2 wt % to 10 wt %, or 3 wt % to 9 wt %, or 4 wt % to 8 wt %. Then the flour may be further processed to prepare the RTE or RTD product.

Figure 2:
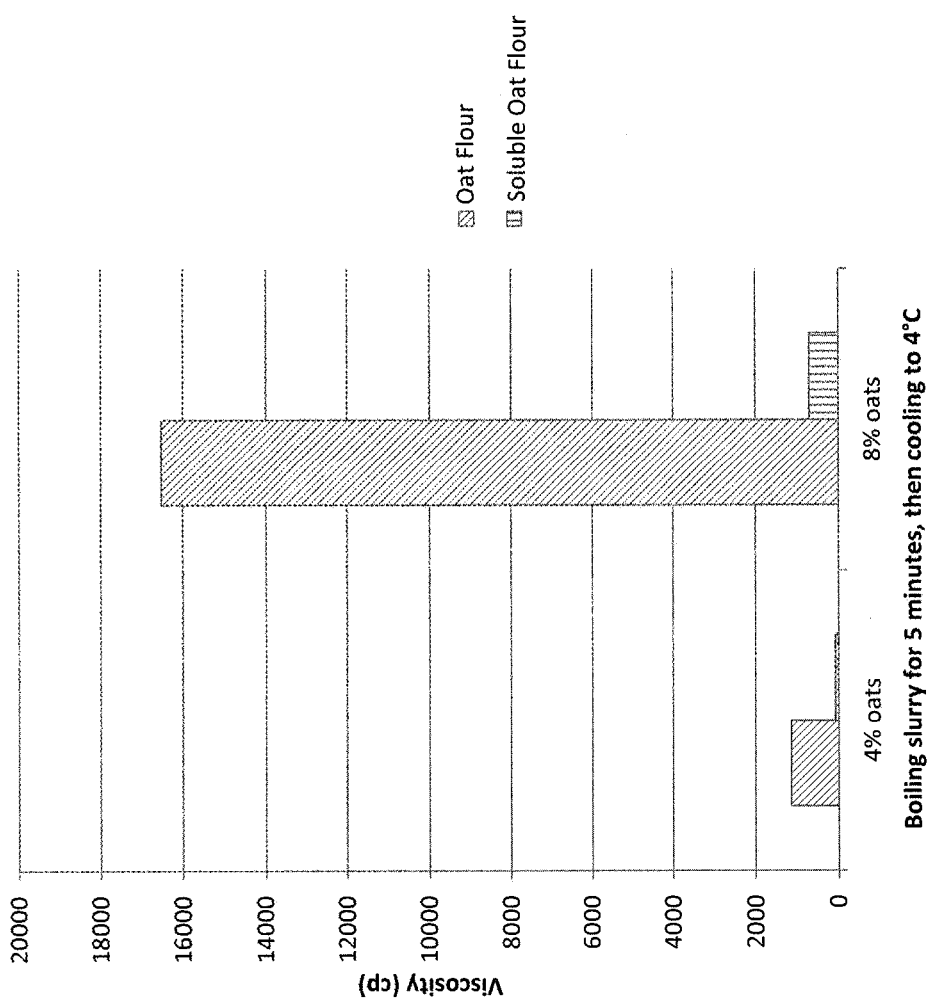
FIG. 2 depicts the viscosity of oat flour and soluble oat flour slurries after hydration.

Furthermore, it was discovered that after hydration, the soluble oat flour slurry has a much lower viscosity compared to standard or typical oat flour slurry. Attention is drawn to FIG. 2 which demonstrates that standard oat flour produced a much higher viscosity than soluble oat flour especially at higher concentrations of oats. In fact, the viscosity of the soluble oat flour slurry at 8 wt % oats is lower than the viscosity of oat flour at 4 wt % oat concentration.

Such improved viscosity and hydration results were not expected and has thus allowed the soluble oat flour to be used in products to provide better properties such as better hydration and mixing properties, particularly without the need of elevated temperatures. The viscosity of hydrated soluble oat flour in water in amounts of 2 wt % to 10 wt % will generally ranges from 100 to 1600 cp at 24° C.

For typical oat flours, high shear mixing must be used with the hydrated flour prior to adding to beverage ingredients, to reduce viscosity. Because of the relatively low viscosity of the soluble oat flour, there is no need for such a high shear mechanical process step to reduce viscosity driven by starch. Gentle mixing is sufficient.

Therefore, benefits of using soluble oat flour for beverages instead of typical oat flour include simplified manufacturing processes and less capital investment for heating, mixing and cooling equipment.

Soluble oat flour is very effective in dairy beverages because no high temperature heating is required. As discussed above, typically high temperature and time is involved in oat flour hydration. If one wants to use typical oat flour in a dairy beverage, it is recommended to hydrate the oat flour in water because heating fluid milk to the high temperatures required for hydration results in cooked milk flavors. To be able to produce a beverage with high concentration of dairy components, the dairy components must be added as a dairy powder. In contrast, soluble oat flour allows hydration to occur directly in the fluid milk, producing a product with better sensorial properties, for instance, a fresher flavor is associated with the product since the cold milk has not been subjected to a severe heat hydration treatment and therefore does not have the cooked notes commonly associated with heat treating milk. Attention is drawn to U.S. Ser. No. 13/547,733 which is hereby incorporated by reference in its entirety, which describes the benefits of hydrolyzed oat flour in dairy beverages.

Soluble oat flour may also be used in juice beverages. Soluble oat flour can be hydrated in the juice at ambient temperatures or cold temperatures. The juice may be any suitable juice or juice/puree combination. Suitable juices may be acidic or non-acidic, fruit, vegetable, or combinations thereof. Non-limiting examples of juices and purees include, Acai, Aloe Vera Juice, Apple Apricot Nectar, Bancha, Beet, Black Cherry, Black Currant, Blackberry, Blueberry, Boysenberry, Carrot, Celery Coconut, Cranberry, Cucumber, Elderberry, Gogi Berry, Grape, Grapefruit, Kiwi, Strawberry, Tomato, Raspberry, Lemon, Lime, Mango, Orange, Papaya Nectar, Passion fruit, Pear, Pineapple, Plum, Pomegranate, Potato, Prune, Pummelo, Radish, Razzleberry, Sorrel, Spinach, Tangerine, Tomato, Turnip, Watercress, Watermelon, and Wheat Grass. Purees are well-known to those skilled in the art and are generally prepared from smashed or mashed fruits and vegetables.

Suitable RTD juice products such juice-based or milk-based smoothies may be prepared with ½ serving of whole grain oats per 8 oz serving.

| Ingredient | wt % |
| --- | --- |
| Fruit Juice | 65-80 |
| Fruit Puree | 10-30 |
| Soluble Oat Flour | 3.71 |

Flavors, colors, texturizers, anti-foaming agents, fruit pieces or other inclusions, and other additives may be added as is within the skill of the art. It is understood that the juice-based beverages may be made with many types of additives. Artificial and natural, non-nutritive and nutritive, sweeteners may be added if desired. Texturizers may be gums or starches. As noted below, the soluble oat flour may also wholly or partially replace certain texturizers such as gellan gum. The amount of soluble oats added may be to provide up to 1 serving of whole grain oats per 8 oz serving. Generally, the juice may include up to 8 wt % soluble oats, generally 1 to 8%, or 2 to 4 wt %.

Hence, soluble oat flour provides unexpected benefits for liquids such as beverages or yogurts. As discussed above, there is no need to hydrate soluble oat flour in water at high temperature. Instead room temperature or temperatures of 4 to 30° C. are suitable. Second, there is no need for a mechanical process step to reduce viscosity driven by starch. Third, there is no need of a cooling process of a heated oat slurry.

Figure 3:
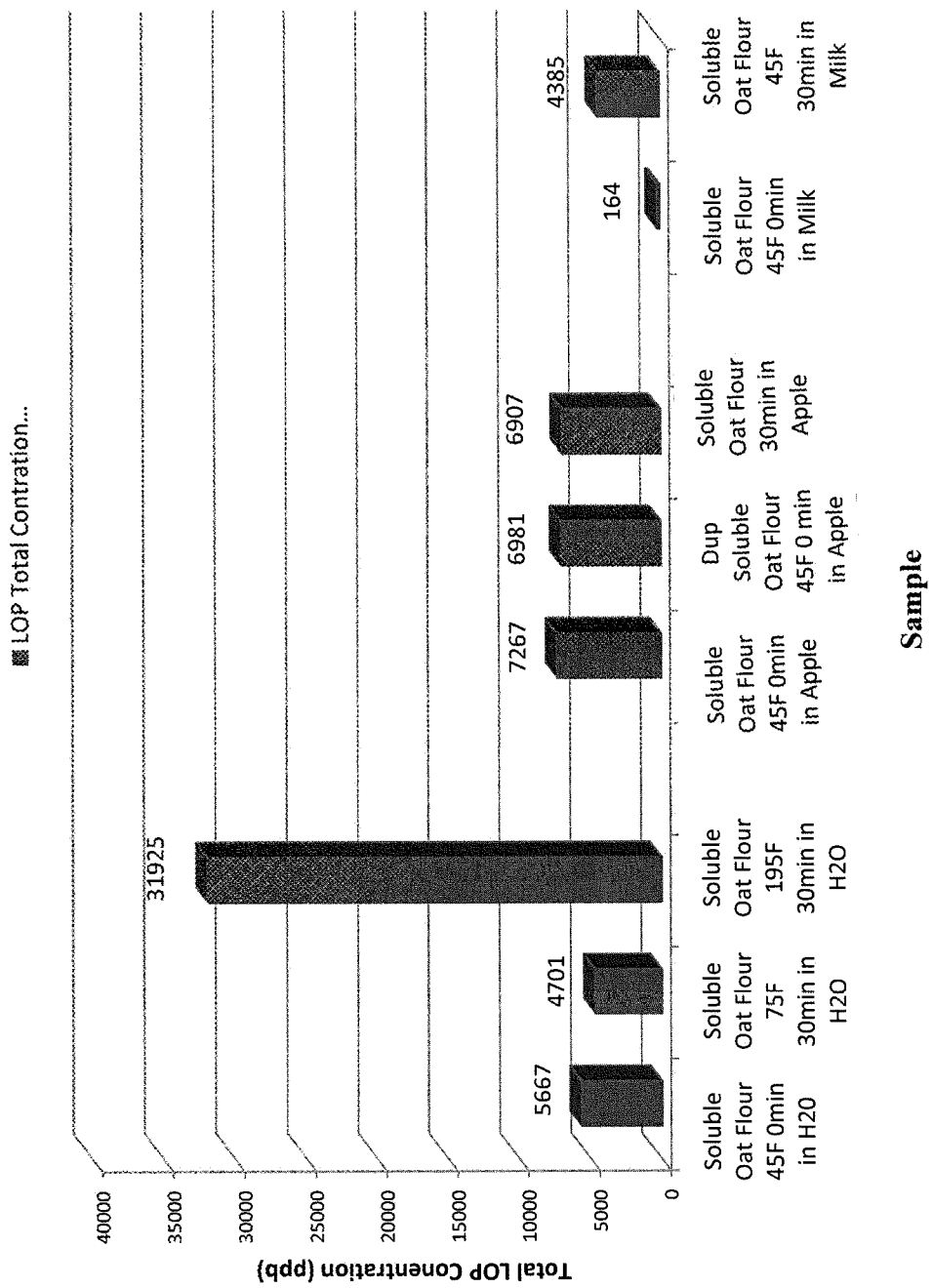
FIG. 3 depicts the analysis of lipid oxidation product ("LOP") in various hydration conditions for soluble oat flour.

FIG. 3 provides an analysis of lipid oxidation product under various hydration conditions. It is shown that the degree of oxidation of the soluble oat flour slurry is driven by hydration temperature and time. That is, FIG. 3 shows that a less oxidized compound was identified with juice samples prepared by cold juice hydration when compared to that prepared by high temperature water hydration.

Soluble oat flour as described herein may also be added to instant powders such as to provide instant cold beverages (e.g. chocolate milk) or whole grain oat "shots" for smoothie or other beverages. In particular, the consumer purchases the instant powder and mixes it with a liquid, including, without limitation, water, juice, or milk. Soluble oat flour provide less and slower sedimentation of insoluble solids and further provides a less grainy or gritty mouthfeel compared to other oat flours. Soluble oat flour also provides a slight oatmeal flavor bringing authenticity to the product versus a "raw flour" flavor when using oat flour. One aspect of the instant powder is provided below:

| Ingredient | wt % |
| --- | --- |
| Soluble Oat Flour | 50-70 |
| Sugar | 30-45 |
| Salt | 0.6-0.8 |
| Stabilizers | 0.7-0.9 |
| Flavors | 2.5-5 |

Figure 4:
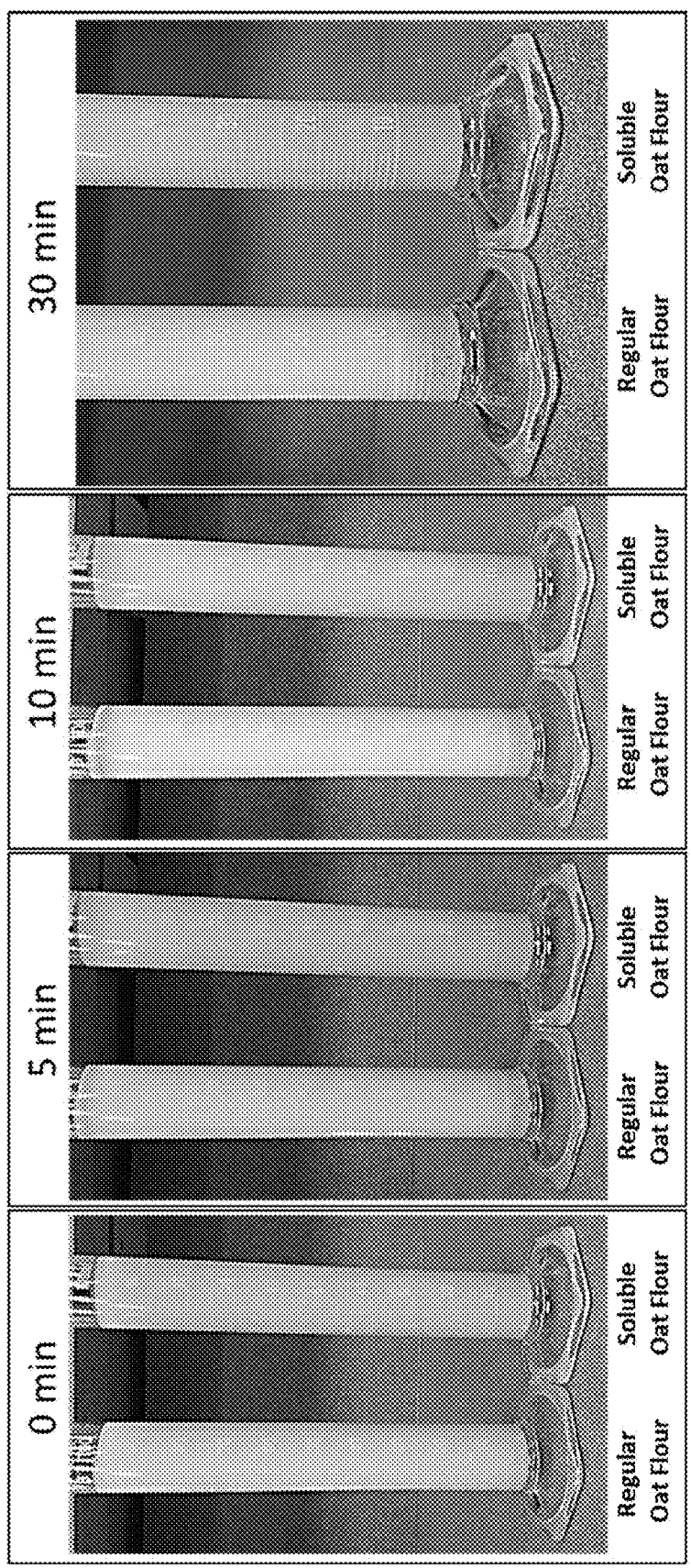
FIG. 4 is a photograph illustrating the amount of sedimentation observed when regular oat flour is mixed in cold water versus the soluble oat flour mixed with cold water.

Sensory testing (n=13) was performed on a cold instant beverage containing the soluble oat flour of the instant application compared to regular oat flour. FIG. 4 illustrates that the amount of sedimentation observed when regular oat flour was mixed with cold water was much greater than the sedimentation observed when soluble oat flour was mixed with cold water. Specifically, FIG. 4 shows the sedimentation of a sample containing regular oat flour and soluble oat flour suspensions after 5, 10 and 30 minutes following preparation. The separation of phases in the regular oat flour sample was observed after only 5 minutes following preparation. Additional results of the sensory tasting are shown in Table 1 below.

TABLE 1

| Question | Regular Oat Flour | Soluble Oat Flour |
| --- | --- | --- |
| Which samples is grittier? | 58% | 42% |
| Which sample has a smoother mouthfeel? | 38% | 62% |
| Which sample has a more "raw flour" flavor? | 69% | 31% |

Soluble oat flour as described herein may also be added to instant powders such as to provide instant hot beverages. Soluble oat flour provides less and slower sedimentation of insoluble solids and lower viscosity at temperatures at which hot beverages are customarily consumed. That is, as demonstrated in FIG. 5, there is a minimal viscosity increase as a beverage cools down when compared to typical oat flour processed by conventional oat milling methods.

Soluble oat flour included in powders for instant cold beverages may comprise 25 to 90 wt % of the total powder weight. In particular, powders for instant cold beverages such as chocolate milk may comprise 50 to 70 wt % of the total powder weight as noted in the example above and soluble oat flour included in powders as shots for addition to already prepared beverages may comprise 50 to 100 wt % of the total powder weight.

Notably, typical oat flour dispersed in hot water will significantly increase the viscosity of the liquid as the temperature decreases, typically, the viscosity will more than double as the temperature decreases (e.g. increases over 100%). In contrast, the soluble oat flour when dispersed in hot water in the same amount, will not significantly increase the viscosity of the liquid as the temperature decreases (e.g. increases no more than 40%.)

| Ingredient | wt % |
| --- | --- |
| Non-fat dry milk | 30-36 |
| Soluble Oat Flour | 28-32 |
| Sugar | 21-28 |
| Cocoa powder | 7-9 |
| Stabilizers | 1-4 |
| Salt | 0.1-.5 |

Flavors, colors, powdered milk, anti-foaming agents, stabilizers, salt, and other additives may be added to the instant powders for hot and cold beverages as is within the skill of the art. It is understood that the powders may be made with many types of additives. Artificial and natural, non-nutritive and nutritive, sweeteners may be used if desired. The amount of soluble oats depends on the amount desired in the final product. For example, for a ½ to full serving of whole grains, soluble oats included in powders intended for hot beverages may comprise 25 to 50 wt % of the total powder weight for instance 28 to 32 wt % of the total powder weight. Again, a benefit to soluble oat powders is the easy hydration when added to water or other liquids.

Figure 6:
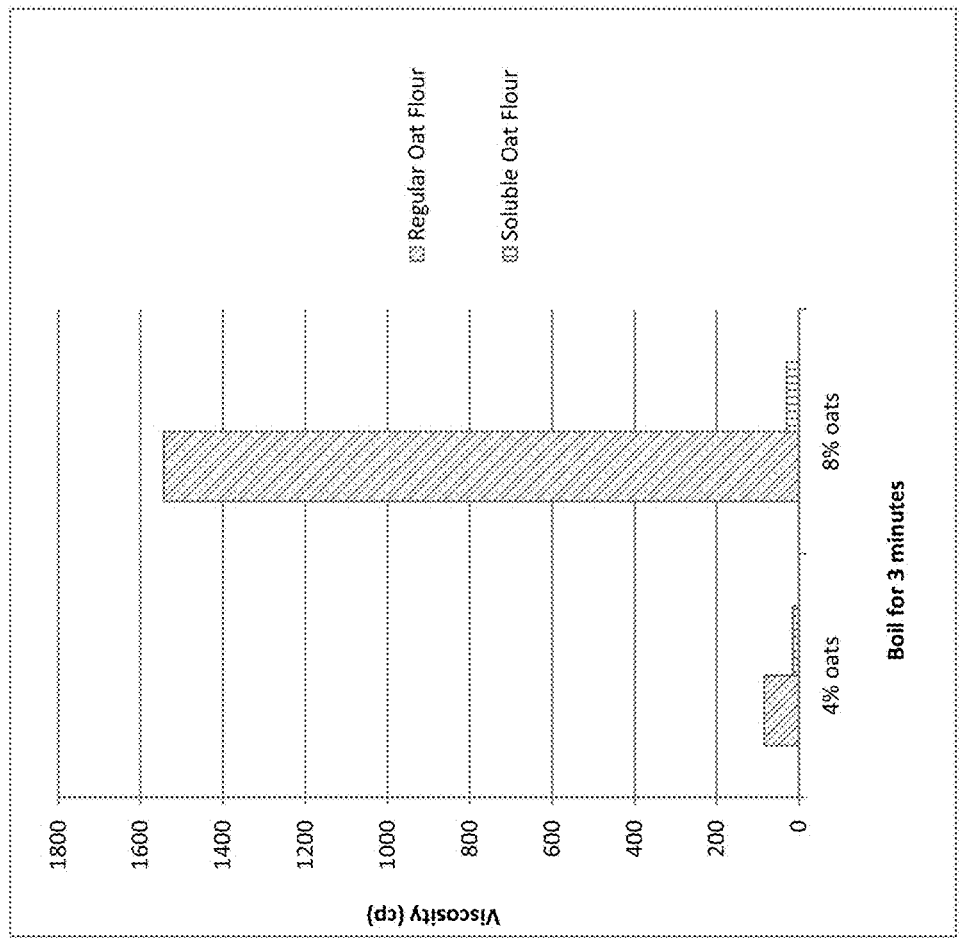
FIG. 6 depicts the viscosity of oat flour and soluble oat flour slurries after boiling in water for three (3) minutes.

Soluble oat flour may also be used in side dishes and entrees such as soups and congee. The easy hydration and lower viscosity of the soluble oat allows addition of higher amounts of whole grain oats per serving size providing increased health benefits. The soluble oat flour may be used in both instant soups and ready-to-eat soups. In one aspect, a ready-to-eat soup comprising about 2 to 10 wt % of soluble oat flour based on total weight of the soup wherein the soluble oat flour provides at least ½ serving of whole grains may be prepared. Attention is drawn to FIG. 6 which demonstrates that standard oat flour produced a much higher viscosity than soluble oat flour especially at higher concentrations of oats. Further, 4% soluble oat flour per 8 oz. serving will ensure delivery of a ½ serving of whole grains which is about 8 grams of oats. Similarly, 8% soluble oat flour per 8 oz. serving will ensure delivery of 1 whole serving of whole grains which is about 16 grams of oats. The viscosity measurements shown in FIG. 6 were taken immediately after boiling for 3 minutes.

A butternut squash soup may be prepared as follows:

| Ingredient | wt % |
| --- | --- |
| Chicken or vegetable broth | 45-60 |
| Butternut squash | 30-40 |
| Onions | 7-10 |
| Soluble Oat Flour | 3-5 |
| Butter and oil | 1.2-1.5 |
| Garlic | 0.2-1 |
| Salt | 0.2-0.6 |
| Spices | 0.01-0.05 |

Suitable spices may be a combination of cinnamon, allspice, cayenne pepper, and black pepper. Any of the ingredients may be modified or replaced as appropriate for the particular desired result.

Figure 5:
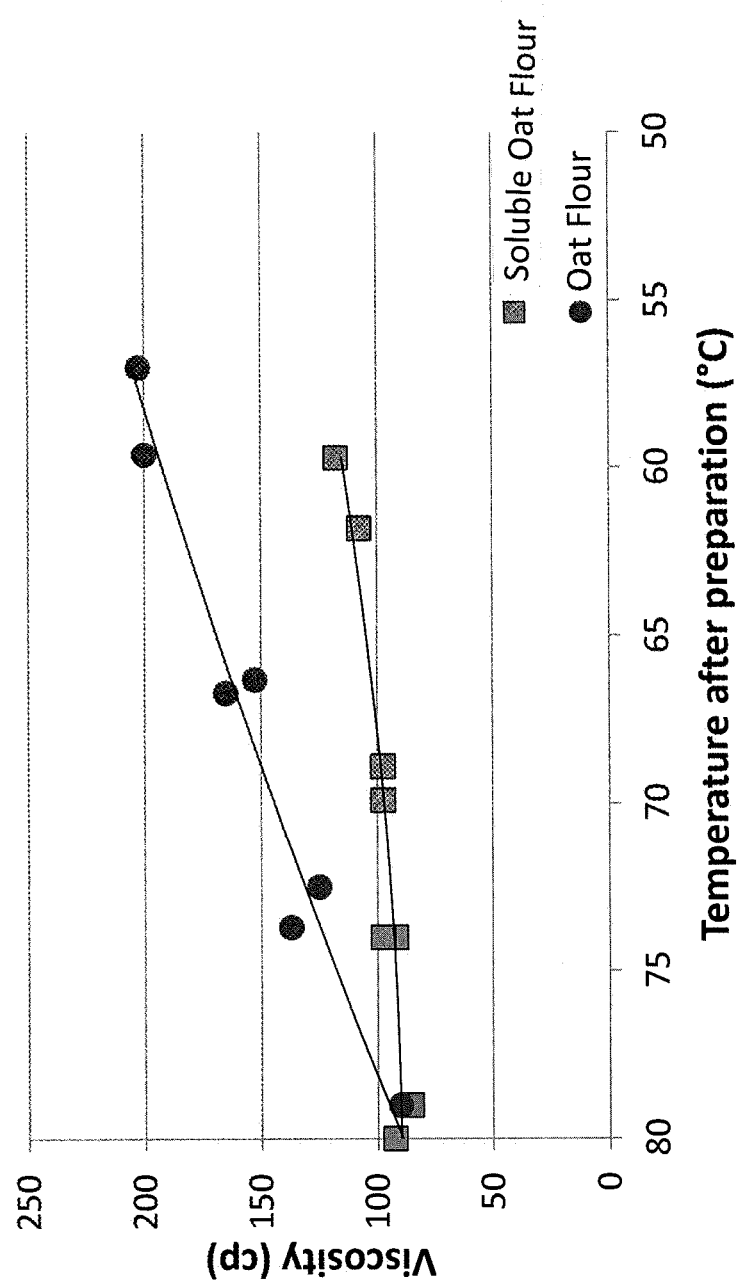
FIG. 5 depicts viscosity of instant hot beverages containing unprocessed oat flour and soluble oat flour after the beverages cool down.

Soluble oat flour may also be used in semi-solid dairy products such as yogurt, ice cream, or spreads. The benefits of using the soluble oat flour of the instant application in semi-solid dairy products include easy hydration, minimal to no increase of viscosity during processing as shown in FIG. 5. For example, yogurt may be prepared with a ½ serving of whole grain oats per 6 oz serving:

| Ingredient | wt % |
| --- | --- |
| Milk/Other dairy | 89.1 |
| Soluble Oat Flour | 5.3 |
| Sugar | 5 |
| Texturizers | 0.6 |
| Yogurt Culture | Mfr spec. |

Flavors, colors, texturizers, fruit preparations, fruit pieces or other inclusions, and other additives may be added as is within the skill of the art. It is understood that the yogurt may be made with many types of additives and that the amounts of the ingredients may vary. The sugar may be wholly or partially replaced with any suitable artificial and natural, non-nutritive and nutritive, sweeteners. Texturizers may be gums or starches. As noted below, the soluble oat flour may also wholly or partially replace certain texturizers such as guar gum. The amount of soluble oats added may be to provide up to 1 serving of whole grain oats per 6 oz serving. Generally, the yogurt may include up to 11 wt % soluble oats, generally 2 to 11%, or 2.5 to 6 wt %.

Soluble oat flour as described herein may also be added to instant powders such as to provide instant puddings. Such products provide a smoother texture with a reduced grainy or gritty mouthfeel.

| Ingredient | wt % |
| --- | --- |
| Modified starches/maltodextrin | 45-50 |
| Sugar | 20-25 |
| Soluble Oat Flour | 20-25 |
| Tetrasodium pyrophosphate | 0.5-2.0 |
| Flavors | 0.1-2.0 |
| Color | 0.1-2.0 |
| Acetylated monoglycerides | 0.1-1.5 |
| Dipotassium phosphate | 0.1-1.5 |

Moreover, additional testing showed that the instant pudding product made with the soluble oat flour described herein providing a firmer, more pudding-like texture compared to the same product made with regular oat flour using the same amount of texturizers. Table 2 below identifies the result of a sensory testing of the pudding products.

TABLE 2

Sensory tasting of an instant pudding. Results show percent of responses (n = 13).

| Question | Regular Oat Flour | Soluble Oat Flour |
| --- | --- | --- |
| Which samples is grittier? | 77% | 23% |
| Which sample has a smoother texture? | 23% | 77% |

Flavors, colors, powdered milk, anti-foaming agents, stabilizers, salt, and other additives may be added to the instant powders for pudding as is within the skill of the art. It is understood that the powders may be made with many types of additives. Artificial and natural, non-nutritive and nutritive, sweeteners may be used if desired. The amount of soluble oats depends on the amount desired in the final product. For example, soluble oats included in powders intended for puddings may comprise 10 to 50 wt % of the total powder weight, for instance 20 to 25 wt % of the total powder weight.

Soluble oat flour may be added to a variety of bakery products in combination with oat, wheat, and/or other grain flour. Baked products include, but are not limited to, cookies, muffins, breads, bagels, pizza crust, cakes, crepes, and pancakes. Soluble oat flour provides improved texture with typical commercial oat flour versus such oat flour alone.

Texturizers are typically gums or starches (e.g. corn starch). Instead of such typical texturizers, soluble oat flour may be used to improve the textural properties of baked products. The soluble oat flour may be present in amounts of 2 to 10 wt % as a texturizer.

For example soluble oat flour may be used as a texturizer in soft baked cookies. Cookies are made with oat flour and/or oat flakes to provide ½ serving of whole grain oats (8 g) may have up to about 25 wt % of the oat flour replaced with soluble oat flour. Replacement of a portion of the oat flour with soluble oat flour provides a moister texture. The cookie containing soluble oat flour may also provide a more crumbly texture. In limited instances a chewier texture was also observed. A suitable soft baked cookie recipe:

| Ingredient | wt % |
| --- | --- |
| Oat flakes and Oat flour | 17-26 |
| Sugars: sucrose, invert sugar, fructose | 17-26 |
| Wheat flour | 15-25 |
| Shortening and oils | 10-16 |
| Food fibers | 5-8 |
| Water | 5-7 |
| Soluble Oat Flour | 2-5 |
| Egg solids | 1.5-2.2 |
| Corn syrup | 1.3-2.0 |
| Leavening agents | 1.2-1.8 |
| Emulsifiers | 0.8-1.2 |
| Salt | 0.3-0.4 |

Sensory testing (n=13) was conducted on cookies made in accordance with the formula above along with cookies made by replacing the soluble oat flour with regular oat flour. The results are included in Table 3 below.

TABLE 3

| Question | Regular Oat Flour | Soluble Oat Flour |
| --- | --- | --- |
| When broken apart, which samples seems more crumbly? | 31% | 69% |
| Which sample has a moister texture? | 23% | 77% |

Any of the ingredients may be modified or replaced as appropriate for the particular desired result.

Soluble oat flour may be used in muffins. For example, muffins made with oat flour to provide 1 full serving of whole grain oats (16 g) may have up to about 50 wt % of the oat flour replaced with soluble oat flour. Replacement of a portion of the oat flour with soluble oat flour provides a moister texture and more crumbly product. A suitable muffin recipe:

| Ingredient | wt % |
| --- | --- |
| Wheat flour | 15-18 |
| Sugar | 6-8 |
| Leavening agents | 1.8-2.3 |
| Salt | 0.3-0.4 |
| Eggs | 6-8 |
| Milk | 22-28 |
| Butter | 7-9 |
| Blueberries | 9-12 |
| Oat flour | 7-9 |
| Soluble Oat Flour | 7-9 |
| Water | 4-5 |

Sensory testing (n=13) was conducted on muffins made in accordance with the formula above along with muffins made by replacing the soluble oat flour with regular oat flour. The results are included in Table 4 below. Further, the majority of panelists noted that the top of the muffins containing the soluble oat flour had a crustier texture and more coarse appearance.

TABLE 4

| Question | Regular Oat Flour | Soluble Oat Flour |
| --- | --- | --- |
| Which sample has a moister texture? | 42% | 58% |
| Which sample is more crumbly? | 42% | 58% |

Any of the ingredients may be modified or replaced as appropriate for the particular desired result.

Soluble oat flour may also be used in ready-to-eat high moisture snacks such as RTE puddings, fruit leather, and fruit gels. The lower viscosity of the soluble oat flour at the same level of typical oats allows addition of higher amounts of whole grain oats per serving. Soluble oat flour provides improved mouthfeel (less slimy or less slippery mouthfeel and lower undesirable mouthcoating).

A fruit Gel snack may be prepared as follows:

| Ingredient | wt % |
| --- | --- |
| Fruit puree | 43-53 |
| Water | 28-34 |
| Soluble Oat Flour | 8-14 |
| Sugars: sucrose and fructose | 8-10 |
| Acidulants | 0.9-1.1 |
| Flavors | 0.9-1.1 |
| Texturizers | 0.25-0.5 |
| Calcium chloride | 0.1-0.2 |

Sensory testing (n=13) was conducted on fruit gels made in accordance with the formula above along with fruit gels made by replacing the soluble oat flour with regular oat flour. The results are included in Table 5 below.

TABLE 5

| Question | Regular Oat Flour | Soluble Oat Flour |
| --- | --- | --- |
| Which sample is slimier? | 62% | 38% |

Colors, preservatives, and other additives may be as needed or desired. Further, any of the ingredients may be modified or replaced as appropriate for the particular desired result.

Soluble oat flour may also be used in sauces and seasoning mixes for preparation of various foods such as gravies, creamy sauces, seasoning mixes added during preparation of rice or pasta.

Soluble oat flour may also be used as a texturizer in instant oatmeal products. Texturizers improve the overall texture of a bowl of instant oatmeal The instant oatmeal comprises oat flakes and a powder comprising flavors, sweeteners, and texturizers such as guar gum. The texturizers are generally present in an amount of 0 to 1 wt % based on the total weight of the instant oatmeal dry mix. Soluble oat flour may replace a portion or all of the guar gum. For example, a suitable instant oatmeal dry mix will contain 0 wt % guar gum and 0.09 wt % to 0.3 wt % soluble oat flour based on total weight of the instant oatmeal dry mix.

Soluble oat flour was used to replace all of guar gum in instant oatmeal in selected varieties. Soluble oat flour level was 50 to 75% guar gum usage rate. No significant differences were detected. A sensory discrimination test (Triangle test) was used with 60 panelists to evaluate if there were significant differences between oatmeal samples made with guar gum or soluble oat flour. Panelists were presented with 3 samples, from which 2 were the same and 1 was different. Panelists were asked to identify the different sample. No statistically significant differences were found between samples made with guar gum or soluble oat flour in two varieties of instant oatmeal.

Figure 7:
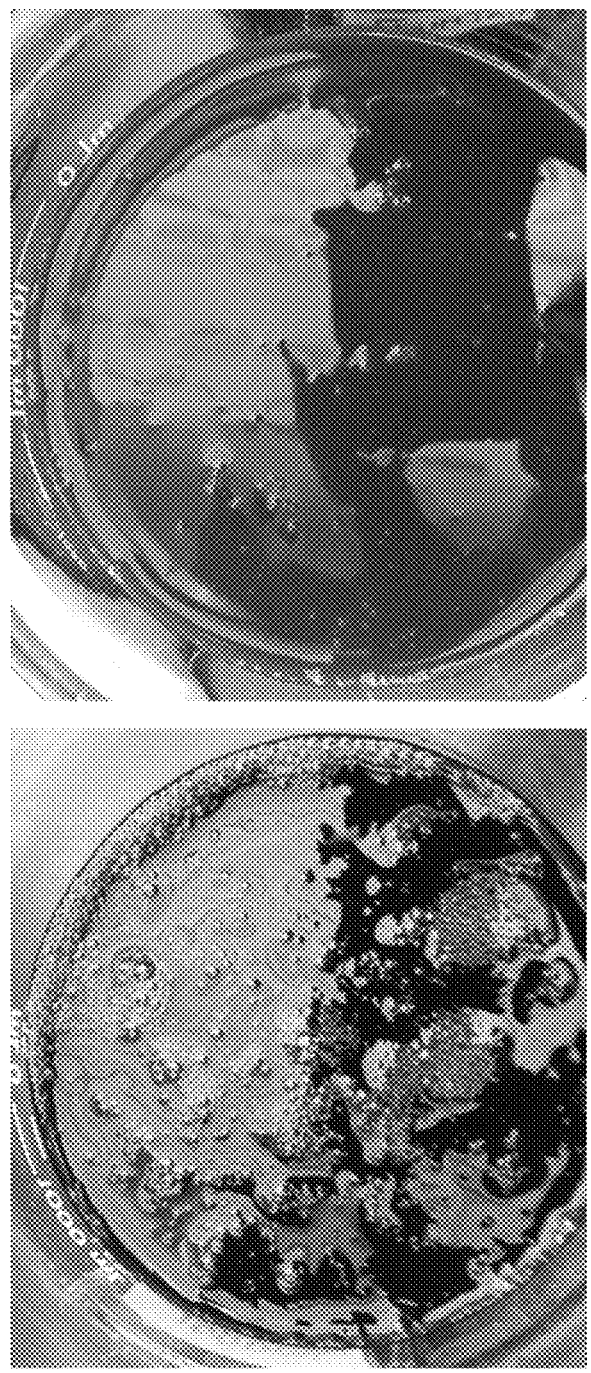
FIG. 7 is a photograph illustrating the antifoaming properties observed when the soluble oat flour is included in a slushie.

Soluble oat flour may be used in frozen commodities such as slushies and ice cream. In one aspect, a frozen commodity selected from the group consisting of ice cream and slushies comprising soluble oat flour in an amount of 2 to 10 wt % based on total weight of the frozen commodity may be prepared. It was discovered that soluble oat flour may be used in slushie and ice cream products for not only the health benefits of the whole grain oat flour, but because of the lower viscosity benefits during processing of these products, since the soluble oat flour does not require hydration like regular oat flour. Moreover, slushies made using the soluble oat flour of the instant invention exhibited antifoaming properties as illustrated in FIG. 7. The term "antifoaming properties" as used herein refers to the ability of a component to reduce or prevent the formation of air bubbles or foam during processing of liquids or semisolids.

A ready-to-eat mixed berry slushie may be prepared as follows:

| Ingredient | Wt % |
| --- | --- |
| Filtered water | 45 |
| Sucrose | 16 |
| Fruit purees | 14.8 |
| White grape juice | 12 |
| Soluble oat flour | 4.6 |
| Yellow carrot juice | 4.0 |
| Sweet potato concentrate | 2.4 |
| Ascorbic acid | 0.8 |
| Xanthan gum and others | 0.8 |

The water should be suitable for use in food such as water treated by reverse osmosis. The total water may be provided in part or in whole from other parts of the food, especially if milk, juices, or other water containing components are used. For instance, the milk may be dairy (e.g. whole, 2%, 1%, or non-fat) or non-dairy (e.g. soy). The milk may also be produced from powdered milk and water.

Additional ingredients may be added to the beverage and food products. Such ingredients can include grain or non-grain-based ingredients. For example, flavoring agents, coloring agents, sweeteners, and salts. Flavoring agents such as fruit flavors, chocolate flavors, or spice flavors may be added to enhance the taste of the product. Fruit flavoring agents include, for example, strawberry, mango, banana and mixtures thereof. Spices, in particular, cinnamon, can be used. In addition, any desired flavor or flavors can be used.

Suitable sweeteners—artificial or natural, nutritive or non-nutritive, can be added in the food product to provide a desired sweetness. For example, brown sugar, maple sugar or fruit sugar can be used. It is noted that the percentage of soluble oat flour will increase if high intensity sweeteners are used.

Other optional ingredients may include, but are not limited to, hydrocolloids, polysaccharides, thickeners, caffeine, dairy, coffee solids, tea solids, herbs, nutraceutical compounds, electrolytes, vitamins, minerals, amino acids, preservatives, alcohol, colorants, emulsifiers, and oils as known in the art. Fruit and nut components may also be included as well as chips or pieces such as chocolate chips. Fruit components can include fruit puree; fresh fruit, fruit preserves, fruit sorbet, fruit sherbet, dried fruit powder, and combinations thereof. Typically, fruit or nut component have particles sufficiently small that the component may be safely swallowed without chewing. Acidulants may be used to adjust the pH, for example a pH of less than about 4.6 for an acidic beverage—e.g. juices or colas.

Figure 8:
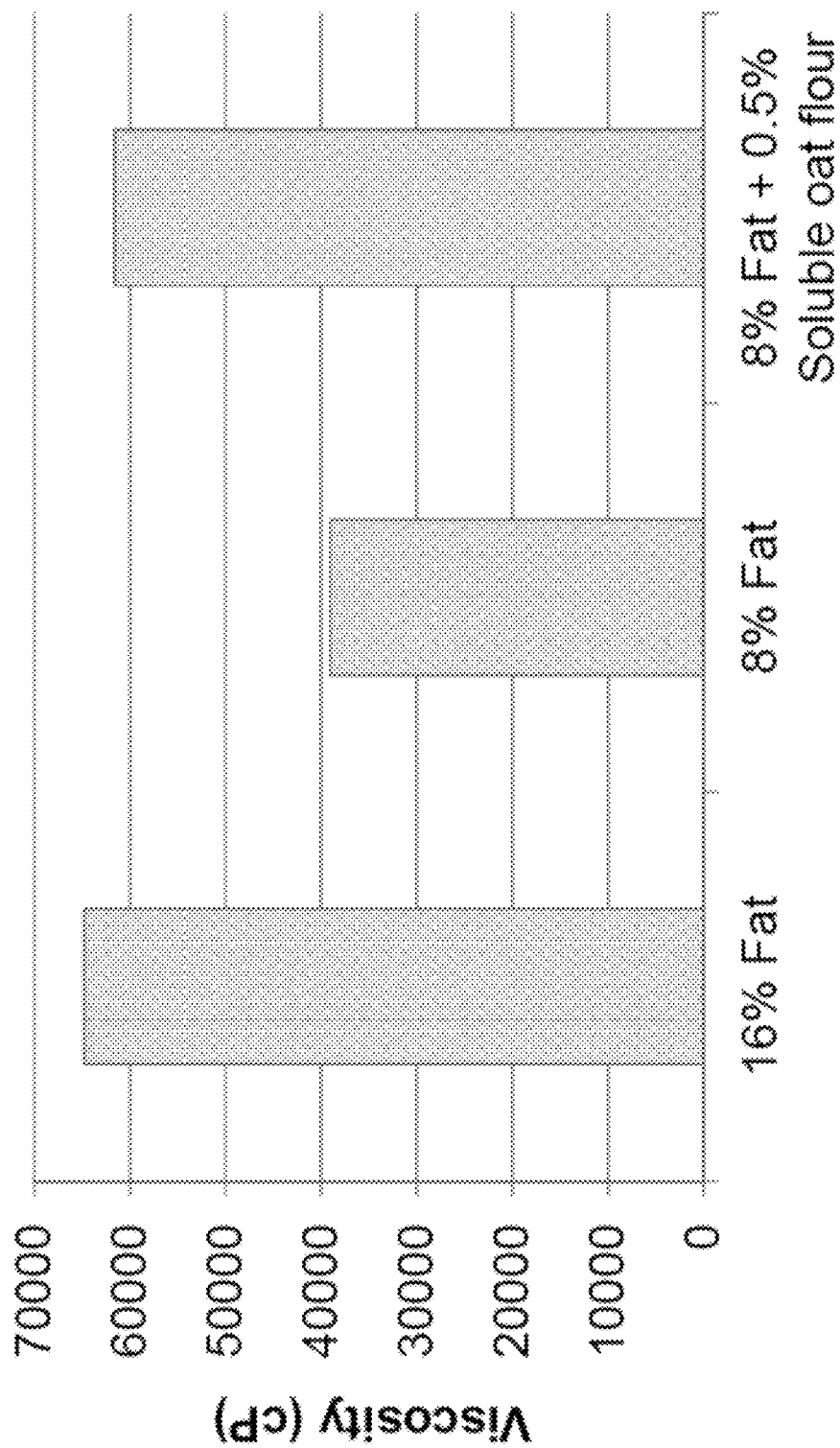
FIG. 8 depicts the viscosities of a full fat dip, a 50% reduced fat dip, and a 50% reduced fat dip containing soluble oat flour.

The soluble oat flour also may be used as a fat replacer. For instance, the soluble oat fiber was used as a fat replacer in creamy dips to obtain a 50% fat reduction. FIG. 8 depicts the viscosities of a full fat dip, a 50% reduced fat dip, and a 50% reduced fat dip containing soluble oat flour. In particular, a 50% reduced fat dip containing the soluble oat flour described herein exhibited a viscosity similar to the full fat dip.

A reduced fat dip may be prepared as follows:

| Ingredient | Wt % |
| --- | --- |
| Water | 77.85 |
| Oil | 8 |
| Starch | 3 |
| Seasoning/flavorant | 4 |
| Protein | 3 |
| Acids | 1.5 |
| Salt | 1.5 |
| Emulsifier | 0.5 |
| Phosphate | 0.3 |
| Gums | 0.2 |
| Soluble oat flour | 0.15 |

The invention may be embodied in other specific forms without departing from the spirit or essential characteristics thereof. The foregoing embodiments, therefore, are to be considered in all respects illustrative rather than limited the invention described herein. Scope of the invention is thus indicated by the appended claims, rather than by the foreign description, and all changes that come within the meaning and range of equivalency of the claims are intended to be embraced therein.

What is claimed is:

1. A bakery product selected from the group consisting of muffins, cookies, breads, bagels, pizza crust, cakes, crepes, and pancakes; wherein the bakery product is prepared from ingredients comprising whole grain oat flour in an amount of 2 to 10 wt. % as a texturizer; and wherein the whole grain oat flour is highly dispersible in water so that there are no lumps of the whole grain oat flour in a mixture of the whole grain oat flour and water at 25° C. after stirring the mixture for 5 seconds.

2. The bakery product of claim 1 wherein the product is a cookie comprising 15-35 wt. % oat flour wherein the oat flour further comprises oat flakes, oat flour, and whole grain oat flour.

3. The bakery product of claim 2 wherein oat flakes and oat flour comprise 15-25 wt. % of the cookie and whole grain oat flour comprises 2-5 wt. % of the cookie.

4. The bakery product of claim 1 wherein the product is a muffin comprising 20-30 wt. % flour and wherein 5-10% of the oat flour is whole grain oat flour.

* * * * *